United States Patent [19]

Wohlhaupter

[11] 4,043,696
[45] Aug. 23, 1977

[54] MICROMETER BORING HEAD
[75] Inventor: Gerhard Wohlhaupter, Frickenhausen, Germany
[73] Assignee: Emil Wohlhaupter u. Co., Frickenhausen, Germany
[21] Appl. No.: 641,942
[22] Filed: Dec. 18, 1975
[30] Foreign Application Priority Data
Dec. 19, 1974 Germany .................. 2460028
[51] Int. Cl.² .......................................... B23B 51/00
[52] U.S. Cl. .................................. 408/179; 408/153; 408/185
[58] Field of Search .............. 408/153, 154, 155, 156, 408/181, 185, 161, 179, 11, 157

[56] References Cited
U.S. PATENT DOCUMENTS

| 2,553,761 | 5/1951 | Gooding | 408/185 X |
| 2,669,890 | 2/1954 | Tao | 408/153 |
| 2,874,597 | 2/1959 | Bach | 408/185 X |
| 3,233,479 | 2/1966 | Everhart | 408/11 |
| 3,309,946 | 3/1967 | Thomas | 408/153 |

FOREIGN PATENT DOCUMENTS

| 1,177,116 | 4/1959 | France | 408/185 |
| 1,075,404 | 2/1960 | Germany | 408/153 |

Primary Examiner—Francis S. Husar
Assistant Examiner—William R. Briggs
Attorney, Agent, or Firm—Hauke and Patalidis

[57] ABSTRACT

A boring tool has a cutter mounted on a holder adjustable relative to the boring tool body. Adjustment of the cutter holder is effected by displaceable wedging surfaces in engagement with each other, one of such wedging surfaces being provided on the cutter holder and the other being provided on an adjustably displaceable wedge piece, the cutter holder body being substantially cylindrical but prevented from rotating by the wedge piece having a plane surface in engagement with a plane surface of the cutter holder.

3 Claims, 4 Drawing Figures

MICROMETER BORING HEAD

BACKGROUND OF THE INVENTION

It is known to provide adjustable boring tools, as disclosed in U.S. Pat. No. 2,874,597, for example, with a cutter holder having a prismatic peripheral surface fitting a similarly shaped guiding bore in the boring tool body, such as to prevent relative rotation of the cutter holder within the guiding bore. However, manufacture of a cutter holder with a non-circular prismatic periphery and machining of a complementary similarly shaped bore in the boring tool body is a difficult, tedious and time consuming task.

The present invention provides an adjustable boring tool or boring head wherein the cutter holder is adjustably held in the boring tool body and is prevented from rotating around the axis of the holder in a manner much simpler than previously provided in the prior art. This is achieved, within the context of the present invention, by utilizing the wedge piece used for adjusting the position of the cutter for preventing axial rotation of a simple circularly cylindrical cutter holder disposed in a generally cylindrical bore in the boring tool body.

SUMMARY OF THE INVENTION

The advantages of the present invention are readily apparent when a structure according to the invention is compared to adjustable boring tools of the prior art and when it is considered that the cutter holder forming part of the present invention, because of its circularly cylindrical peripheral shape, can be manufactured to a large degree by means of relatively simple lathe turning operations, and when it is considered that the guiding bore accepting the cutter holder in the tool body can be drilled out in a complementary cylindrical form. The wedge piece which serves to adjust the position of the cutter by adjusting the position of the cutter holder accomplishes at the same time the function of preventing turning of the cutter holder relative to its receiving bore in the tool housing.

The many objects and advantages of the present invention will become apparent to those skilled in the art when the following description of the best mode contemplated for practicing the invention is read in conjunction with the accompanying drawing wherein:

DETAILED DESCRIPTION OF THE PREFERRED EMBODIMENT

Figure 1:
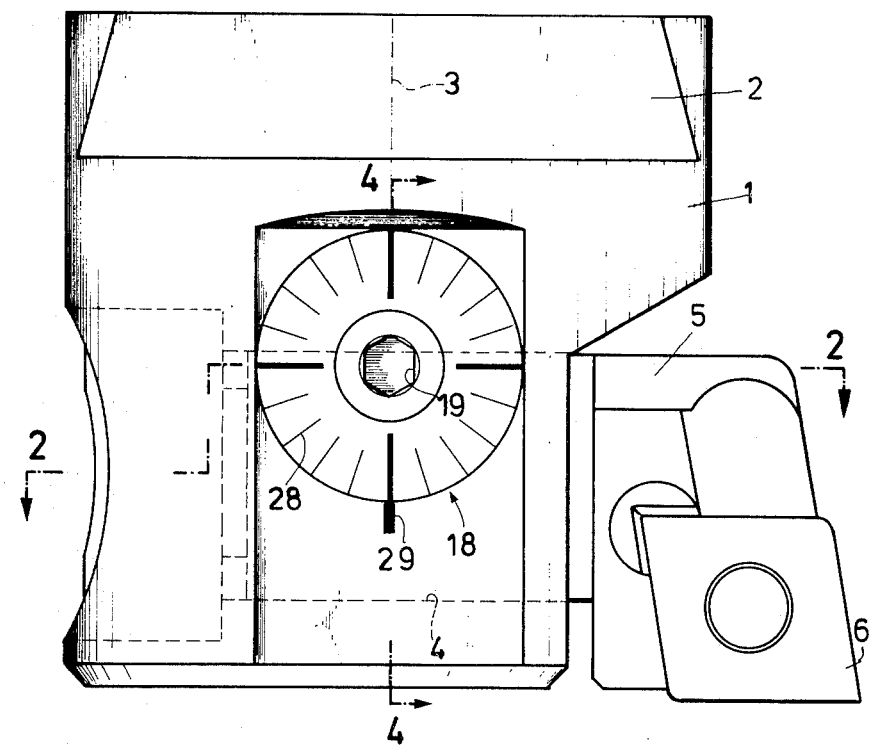
FIG. 1 is a side elevation view of a precision boring tool in accordance with the present invention.

The precision boring head or boring tool of the present invention, as illustrated in the drawing, comprises a tool body 1 for mounting on the end of the rotating spindle of a boring machine, or the like, by any convenient means such as, for example, the dovetail arrangement 2 illustrated at FIG. 1. The axis of rotation of the boring tool is represented by the axis designated by reference numeral 3.

A transverse bore 4 formed in the tool body 1 accepts for sliding engagement therein the body 5 of a cutter holder. An indexable cutter or cutting insert 6, made of tungsten carbide or like material, is mounted on the end of the cutter holder 5 by means well known in the art.

Figure 2:
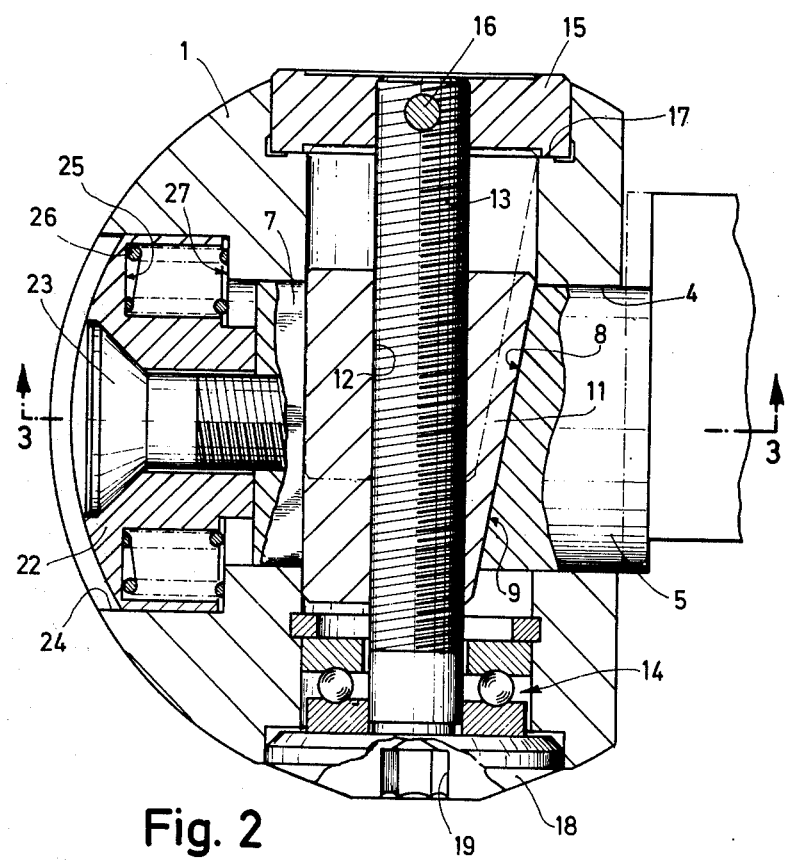
FIG. 2 is a partial sectional view along line 2—2 of FIG. 1.
Figure 3:
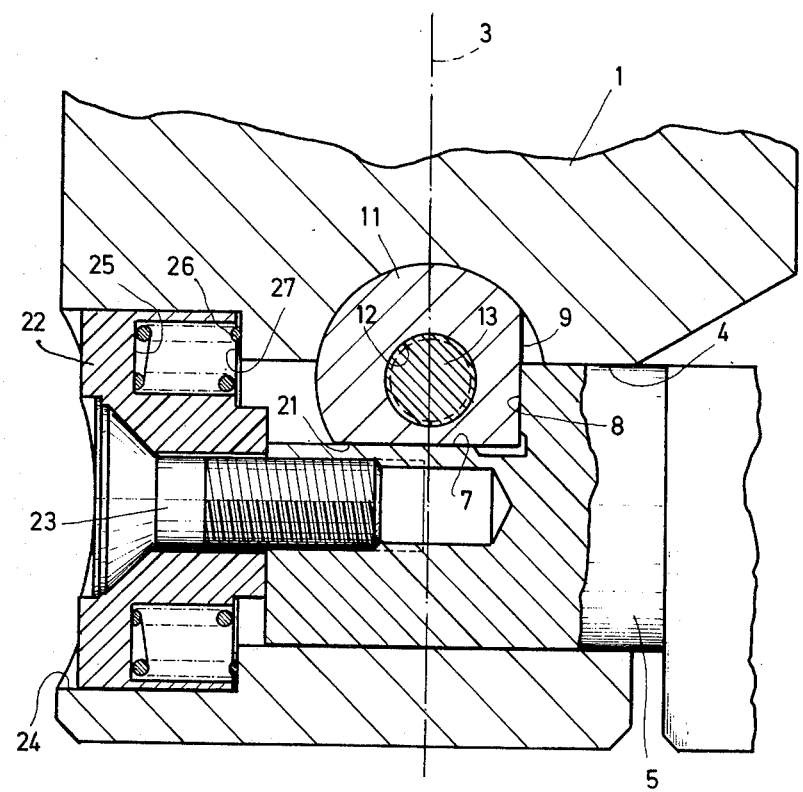
FIG. 3 is a section along line 3—3 of FIG. 2.

As best shown at FIG. 3, the body 5 of the cutter holder is generally circularly cylindrical and is provided with a cut-out portion forming a step-like design defining a precisely fitting surface 7 parallel to the longitudinal axis of the cutter holder body 5, the cut-out portion also forming at one end a shoulder defining a precisely machined wedge surface 8 disposed at right angles to the surface 7. The wedge surface 8, as best shown at FIG. 2, is disposed at an angle to the longitudinal axis of the cutter holder body 5, for example at an angle of 78°, 41 minutes which has been found to be a convenient wedge angle.

Figure 4:
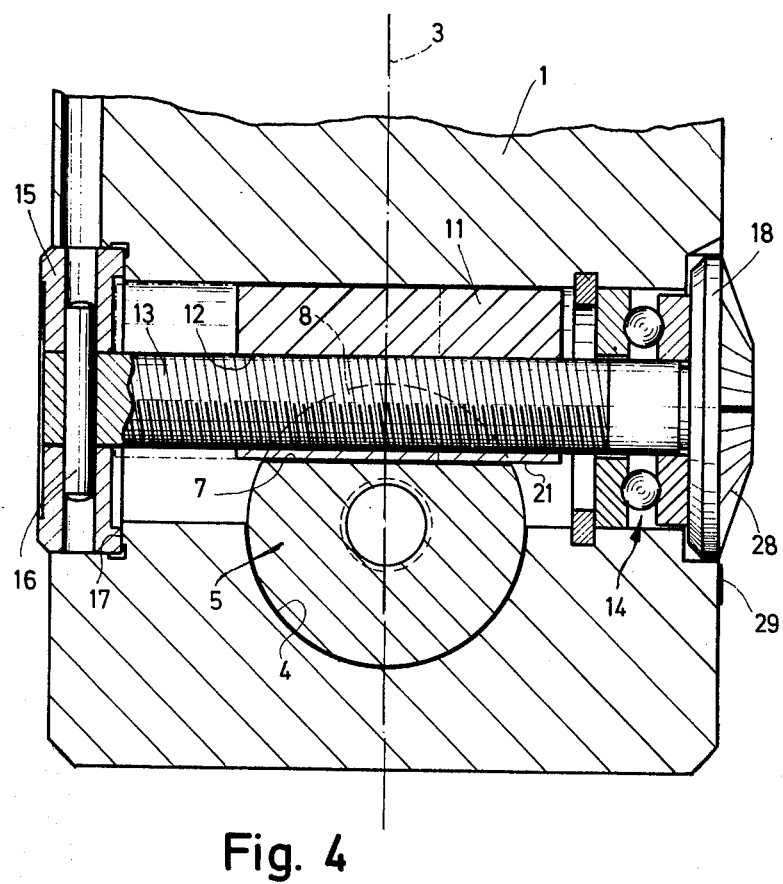
FIG. 4 is a section along line 4—4 of FIG. 1.

A wedge piece 11 is disposed in the space formed at the junction of the longitudinal plane surface 7 and the wedge surface 8, as well as in a complementary recess formed in the tool body 1. The wedge piece 11 is provided with a longitudinally extending internally threaded bore 12 into which is engaged a threaded spindle 13. One end of the threaded spindle 13 is supported and journalled within the tool body 1 by way of an axial thrust ball bearing 14, and the other end is supported by means of a disk 15 which is keyed to the threaded spindle 13 by any convenient means such as a pin 16. The disk 15 is disposed in a circular recess in the tool body 1, and the inner rim of the disk 15 is in sliding engagement with a shoulder 17 formed at the bottom of the circular recess in the tool body 1. The bearing means supporting the threaded spindle 13, namely the ball bearing 14 at one end and the disk 15 engaging the shoulder 17, are axially preloaded such as to prevent any longitudinal motion of the threaded spindle 13. The end of the threaded spindle 13 supported by the ball bearing 14 is provided with an enlarged disk-like head 18 having a hexagonal center recess 19, substantially like an Allen-type cap screw, such that the threaded spindle 13 may be rotated by means of an appropriate key wrench having its end inserted in the hexagonal recess 19. The wedge piece 11 has a plane surface 21, FIG. 3, engaging the plane surface 7 of the cutter holder body 5, such that the wedge piece 11 is prevented from rotating when the threaded spindle 13 is rotated. Consequently, turning the threaded spindle 13 within the threaded internal bore 12 of the wedge piece 11 causes the wedge piece 11 to be shifted laterally relative to the longitudinal axis of the tool holder body 5. FIGS. 2 and 4 illustrate in full lines one extreme position to which the wedge piece 11 can thus be shifted, while illustrating in phantom lines, the other extreme position.

As best shown at FIGS. 2 and 3, the free end of the cutter holder body 5 is provided with a spring block 22 mounted therein by means of a countersunk screw 23. The spring block 22 is disposed slidably movable in a conforming recess 24 formed in the tool body 1, and is provided on one side with a plurality, for example four, six or eight, cylindrical pockets 25 bored from the internal face of the spring block 22. A compressed coil spring 26 having an end abutting against a shoulder 27 formed in the tool body 1 is placed in each pocket 25. In this manner, the springs 26 tend to pull or urge the cutter holder body 5 towards the left, as shown in FIGS. 2 and 3 and therefore bias the tool holder body 5 toward the inside of the tool body 1. As a result, the wedge surface 8 in the cutter holder body 5 is constantly held in engagement with a complementary wedge surface 9 formed on one side of the wedge piece 11, the wedge surfaces 9 and 8 in engagement being ground exactly such as to be parallel. Turning of the adjusting threaded spindle 13 causes advance of the wedge piece 11, and due to the action of the wedge surfaces 8 and 9 in mutual sliding engagement, causes the cutter holder body 5 to be outwardly fed from the tool body 1, such that the cutting edge of the cutter 6 may be set to the desired adjustment position for machining in a workpiece a bore of a precise diameter. As best shown at FIG. 1, the enlarged head 18 of the adjusting threaded spindle 13 is provided with an adjustment scale 28 cooperating with an index mark 29, such that the position of the cutting edge of the cutter 6 may be adjusted with great precision in predetermined increments. For example, the adjustment scale 28 may be designed to provide precision adjustment of at least 0.005mm and up to 0.001mm.

As is readily apparent from the drawing and more particularly from FIGS. 2 and 3, the wedge piece 11 being provided with a fitting plane surface 21 in constant engagement with the plane surface 7 of the cutter holder body 5 and being tightly fitted in the accepting recess in the tool body 1, holds the cutter holder body 5 firmly against rotation about its longitudinal axis. In addition, the wedge piece 11 acts as a precise adjustment means for the cutter holder body 5. The wedge piece 11 therefore accomplishes two simultaneous functions.

It is readily apparent from the above description of the invention that the precision boring tool of the invention consists of only a small number of small and simple components which may be manufactured at relatively low cost. Auxiliary clamping of the cutter holder body 5, after adjustment, is not necessary. The dimensions of the tool may be very small and it may be made for boring 30mm diameter holes with no problem whatsoever, and in special cases even 25mm holes. The total height of the boring tool may be as small as 30mm.

Although in the boring tool of the invention as illustrated and described, the cutter holder body 5 is pulled within the tool body 1 by the springs 26 which bias the wedge surfaces 8 and 9 in contact with each other, the springs 26 may be eliminated by providing surfaces on the wedge piece 11 and on the cutter holder body 5 parallel respectively to the wedge surfaces 9 and 8.

I claim:

1. In a cutting tool rotatable about an axis of rotation wherein the position of a cutter holder is adjustably displaceable in a direction transverse to said axis of rotation by way of a wedge piece slidable in a direction transverse to said axis of rotation and to the direction of displacement of said cutter holder, said wedge piece having a first plane surface in sliding engagement with a corresponding wedge surface on said cutter holder adjustably displacing said cutter holder in an appropriate guiding and holding recess extending in said direction of displacement of the cutter holder, the improvement comprising said cutter holder having a circularly cylindrical body slidably disposed along its longitudinal axis in a generally circularly cylindrical recess of said cutting tool, a cutout portion in said cutter holder defining a second plane surface substantially parallel to the longitudinal axis of said cutter holder and to the sliding direction of said wedge piece, and a corresponding third plane surface on said wedge piece in sliding engagement with said second plane surface preventing rotation of said cutter holder about its longitudinal axis.

2. The improvement of claim 1 wherein said second and third surfaces are disposed substantially at a right angle.

3. The improvement of claim 1 wherein the wedge surface of said wedge piece is engaged with the wedge surface of said cutter holder by spring bias.

* * * * *